(12) United States Patent
Ingistov et al.

(10) Patent No.: US 7,013,718 B2
(45) Date of Patent: Mar. 21, 2006

(54) METHOD FOR MONITORING THE PERFORMANCE OF A TURBINE

(75) Inventors: Steve Ingistov, Los Angeles, CA (US); Michael R. Storar, Orange, CA (US)

(73) Assignee: Watson Cogeneration Company, Carson, CA (US)

( * ) Notice: Subject to any disclaimer, the term of this patent is extended or adjusted under 35 U.S.C. 154(b) by 360 days.

(21) Appl. No.: 10/424,625

(22) Filed: Apr. 28, 2003

(65) Prior Publication Data
US 2004/0240519 A1 Dec. 2, 2004

(51) Int. Cl.
G01L 3/26 (2006.01)

(52) U.S. Cl. .......................... 73/116; 374/141; 374/179
(58) Field of Classification Search .................. 73/116, 73/168; 374/141, 45; 415/118
See application file for complete search history.

(56) References Cited

U.S. PATENT DOCUMENTS

| 2,888,239 | A | * | 5/1959 | Slemmons | .............. | 416/213 R |
| 3,854,843 | A | * | 12/1974 | Penny | ......................... | 415/197 |
| 6,772,581 | B1 | * | 8/2004 | Ojiro et al. | .............. | 60/39.182 |

FOREIGN PATENT DOCUMENTS

JP 59220609 A * 12/1984

* cited by examiner

Primary Examiner—Hezron Williams
Assistant Examiner—Katina Wilson

(57) ABSTRACT

A method and apparatus for monitoring the performance of a turbine by monitoring the temperature in a gap between the inside of a shroud and the tips of the turbine blades as they rotate.

20 Claims, 3 Drawing Sheets

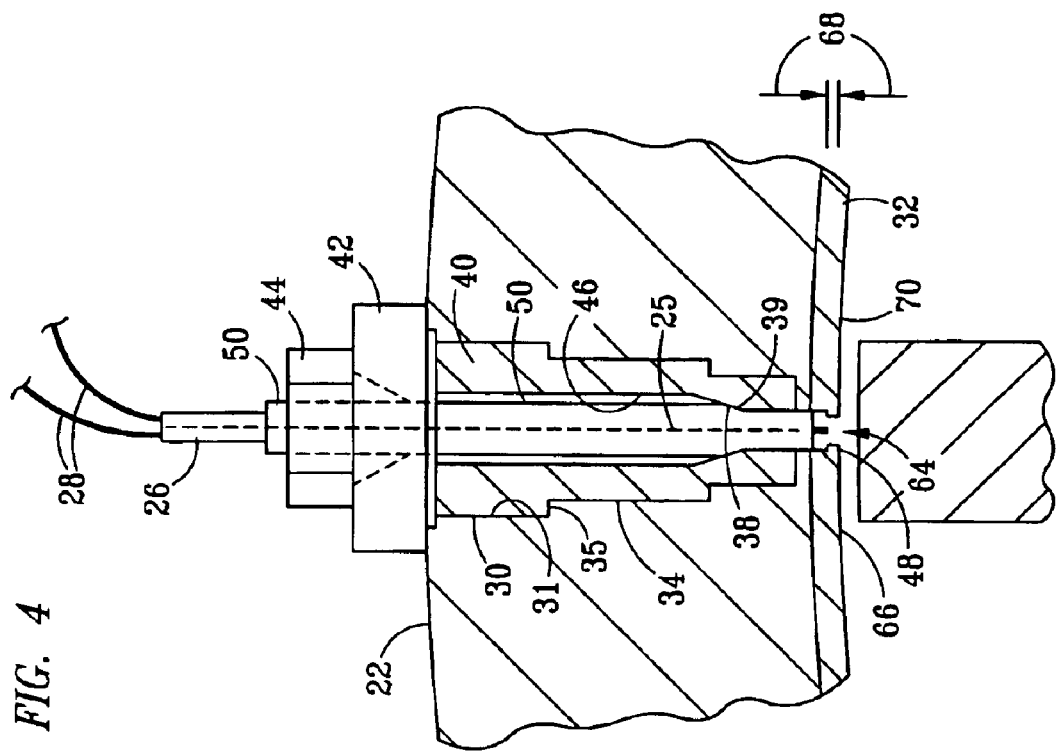

METHOD FOR MONITORING THE PERFORMANCE OF A TURBINE

FIELD OF THE INVENTION

This invention relates to a method and apparatus for monitoring the performance of a turbine by monitoring the temperature in a gap between the inside of the casing and the tips of the turbine blades as they rotate.

BACKGROUND OF THE INVENTION

In the use of turbines for the production of electrical energy by the use of high pressure gases, which are typically high pressure, high temperature combustion gases, to drive the turbines, the turbine blades are typically configured to a clearance (gap) of about 0.20 inches between the outer ends, or tips, of the turbine blades and the inside of the turbine casing, or a shroud or block positioned inside the turbine casing, in an annular position in the same plane as the rotation of the turbine blades. This clearance is provided to avoid any contact of the blade tips with the inside of the casing or the shroud.

Many turbine blades are designed so that cooling air flows outwardly through the turbine blades from a turbine blade wheel and is discharged from the turbine blade tips. In other turbine blades, the cooling gas, which may be steam, air or the like, is circulated inside the blade and may be discharged from a position other than the turbine blade tips, such as the back side of the turbine blades and the like.

The shroud blocks, as discussed, are circumferentially positioned inside the casing in a common plane with the turbine blades and may be hollow and air-cooled. Modern shroud blocks are coated on their inside surface facing the blade tips with special abradable coatings. The purpose of these coatings is to minimize the loss of material at the tip of the blades during abnormal, transient conditions such as sudden variations in turbine workload, start-up, shutdown and the like. In extreme cases where the turbine blades are rubbing the shroud blocks to the extent of removing the abradable coatings, coating shavings may be trapped in the blade cooling holes. As a result, the blade may begin to overheat. The reduced amount of cooling air being issued at the tip of each blade will cause heating of the gases leaking through the gaps. In the instance where the tips of the blades may be rubbed off or the blades are not coaxially positioned inside the casing or the like so that the gap between the tips of the blades and the inside of the casing or the shroud is increased, additional amounts of hot gas will spill over the blade tips. This hot gas is basically wasted for energy generation.

Accordingly, whenever the blade tips are rubbing the abradable coating, higher temperatures may be generated because of the friction between the blade and the abradable coating or as a result of plugging of air cooling channels in the blades and the like. This condition will likely result in the presence of a larger than desired gap on the opposite side of the turbine so that hot gases spill over the tips of the blades and through the gap with the resulting wasted energy. Neither of these conditions is desirable but both are difficult to detect in an operating turbine.

Accordingly, a continuing effort has been directed to the development of methods to determine the performance of operating turbines.

SUMMARY OF THE INVENTION

The present invention is related to a method for monitoring the performance of a turbine, the turbine comprising a casing having an inside and an outside, a shroud positioned on the inside of the casing in the same plane as the rotation of the turbine blades, the shroud having an inside and an outside, the casing containing a plurality of turbine blades rotatably mounted in at least one row on a shaft for rotation inside the shroud with tips of the turbine blades defining a gap between the tips of the rotating turbine blades and the inside of the shroud; the method comprising: positioning at least one thermocouple in temperature-sensing communication with the gap; and, determining the temperature in the gap during operation of the turbine, the temperature in the gap being indicative of the performance of the turbine.

The invention is further related to a system for monitoring the performance of a turbine, the turbine comprising a casing having an inside and an outside, a shroud positioned on the inside of the casing in the same plane as the rotation of the turbine blades, the shroud having an inside and an outside, the casing containing a plurality of turbine blades rotatably mounted in at least one row on a shaft for rotation inside the shroud with tips of the turbine blades defining a gap between the tips of the rotating turbine blades and the inside of the shroud; the system comprising: a plug positioned in an opening in the casing; a portion of the plug being configured to engage a portion of the opening in the casing configured to restrict passage of the plug past the portion of the opening in the casing; and a thermocouple positioned through the plug and in temperature-sensing communication with the gap through an opening in the shroud.

BRIEF DESCRIPTION OF THE DRAWINGS

FIG. 3 is a schematic diagram of an embodiment of a plug for positioning a thermocouple in temperature-sensing contact with the gap between the inside of the shroud and the tips of a turbine blade;

FIG. 4 is a schematic diagram of an alternate embodiment of a plug for positioning a thermocouple in temperature-sensing communication with the gap between the tips of the turbine blades and the inside of the shroud; and, FIG. 5 is a schematic view of the thermocouple positioned in the opening in the shroud.

DESCRIPTION OF THE PREFERRED EMBODIMENTS

In the discussion of the Figures, the same numbers will be used throughout to refer to the same or similar components.

Figure 1:
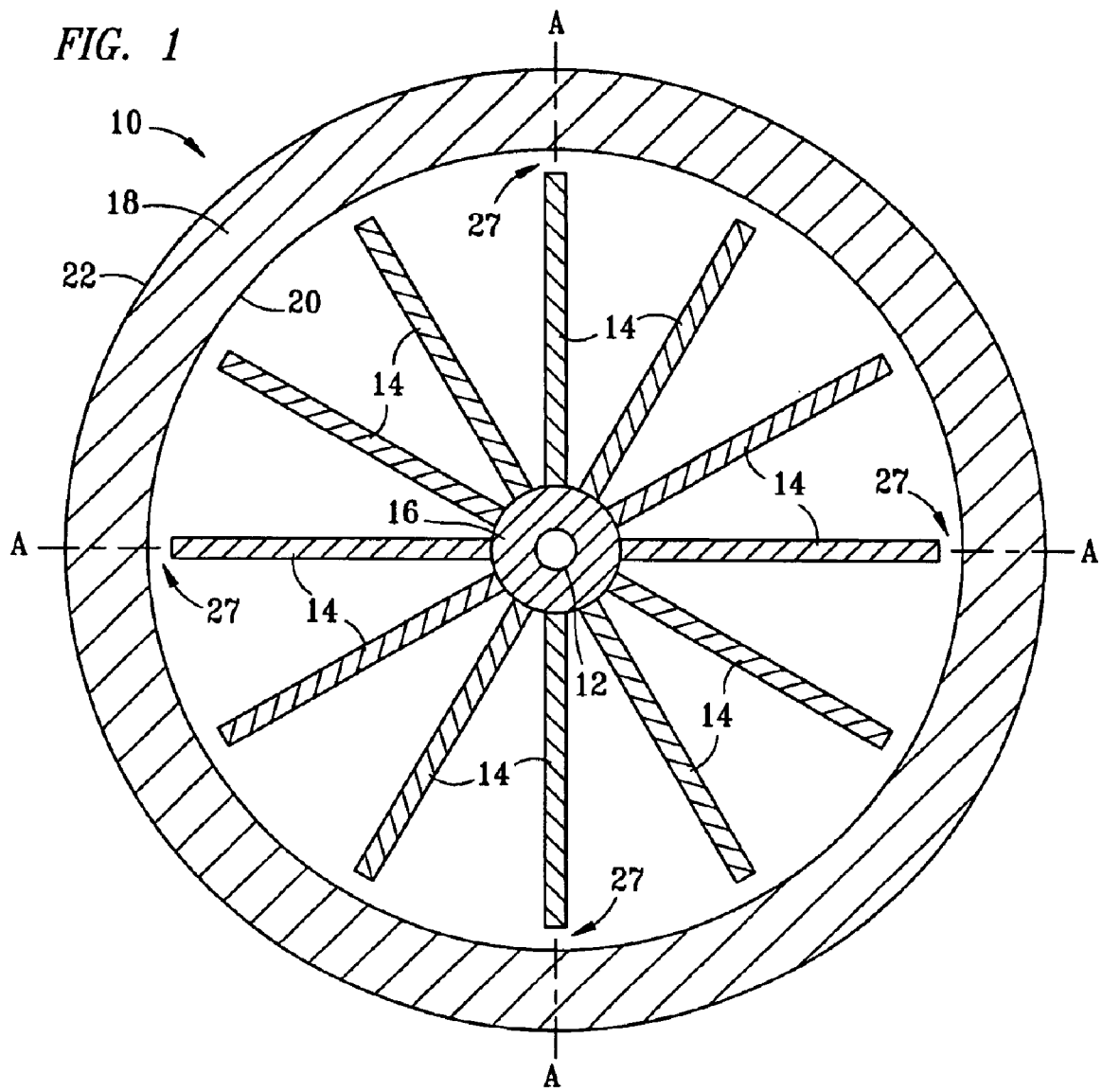
FIG. 1 is a cross-sectional view of a turbine taken through the blades showing the blades in relationship to the casing and showing potential locations for thermocouples positioned according to the present invention.

In FIG. 1, an end view of a turbine taken through the center of the turbine blades in a row of turbine blades is shown. Turbine 10 comprises a casing 18 having an inside 20 and an outside 22. A rotary shaft 12 is coaxially positioned inside casing 18 and supports a turbine blade wheel 16 and turbine blades 14. A plurality of turbine blades 14 is shown. The selection of the number and configuration of turbine blades used in such turbines is well known to those skilled in the art and will not be discussed further.

Turbine blades of a configuration using air cooling wherein the air escapes from the turbine blade tips is shown in co-pending application U.S. Ser. No. 10/195,687 filed Jul. 15, 2002 by Steve Ingistov and Robert L. Pistor entitled "Extended Tip Turbine Blade For Heavy Duty Industrial Gas Turbine." This disclosure is hereby incorporated in its entirety by reference.

At a plurality of locations (A) shown around casing 18, thermocouples are schematically shown as positioned through casing 18 to sense the temperature at a gap 27 between the ends of turbine blades 14 and inside 20 of casing 18. The inside of the shroud is shown as the inside of the casing for ease of description in FIG. 1. The thermocouples are placed at radially spaced-apart positions, and as shown, are spaced 90° apart. The spacing can vary widely and the number of thermocouples around the casing can also vary widely. The number of thermocouples used will depend upon the accuracy of sensing desired and the like.

Figure 2:
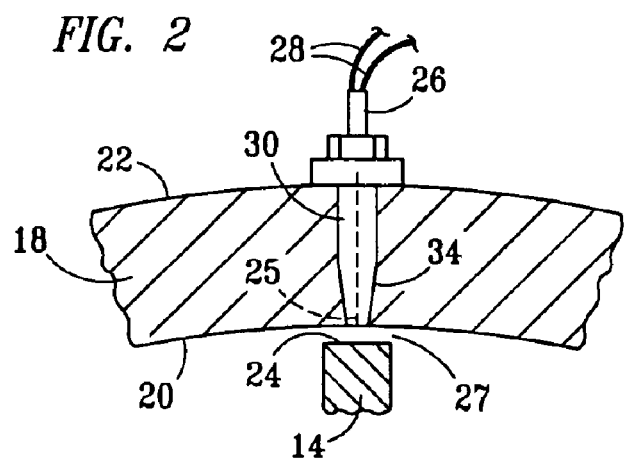
FIG. 2 is a schematic diagram of a thermocouple positioned according to the present invention.

In FIG. 2, a plug 30 is shown positioned in an opening 34 in casing 18. Opening 34 extends through casing 18 and into a shroud (not shown in FIG. 2) but does not extend all the way through the shroud at its full diameter. A thin layer 48 of the shroud (not shown in FIG. 2, but shown in FIGS. 3, 4 and 5) is retained on the inside of the shroud of a thickness sufficient to prevent the passage of materials forming plug 30 or a thermocouple 25 (other than the thermocouple itself) positioned through plug 30 into temperature sensing communication with gap 27. A small opening 64, which is a reduced diameter opening extending from opening 34 through the inside of casing 18 and into shroud 32 (shown in FIGS. 3, 4 and 5), is provided in this thin layer of material. Plug 30 is positioned in opening 34 and retained in position, as will be discussed subsequently. Typically, thermocouple 25 is positioned through plug 30 and comprises, along at least a portion of the distance through plug 30, a coaxial cable 26. Coaxial cable 26 can be used to facilitate the connection of thermocouple leads 28 to a suitable temperature sensing and monitoring system at a distance from casing 18 and the like. A turbine blade 14 is shown having a tip 24, which as rotated, defines a gap 27 between tip 24 and inside 70 of shroud 32.

No shroud, as customarily used, is shown in FIG. 2.

As well known to those skilled in the art, the shroud is typically positioned inside casing 18 around the circumference of the inside of casing 18 in the path defined by the outside tips of the turbine blades as they rotate. Typically, the shroud blocks are identical blocks equally spaced around the circle and have an abradable surface on their inside faces facing the turbine blade tips and may be hollow and air-cooled as known in the art.

Such shroud blocks are shown as shroud 32 in FIG. 3. In FIG. 3, the thermocouple is installed by positioning a coaxial cable 26, including the thermocouple, through a plug 30 retained in position in casing 18 by a retaining nut 44 in combination with a plug cover 42. A variety of connectors can be used for maintaining plug 30 in position in opening 34. Desirably, plug 30 is rigidly and fixedly held in position in opening 34 and retains thermocouple 25 in position. An end portion of thermocouple 25 extends into a small opening 64 in the shroud 32. Plug 30, as formed and shown in FIG. 3, includes a tapered portion 38 which engages a mating tapered portion 39 in opening 34. The mating of these two tapered sections restricts the inward movement of plug 30 into opening 34. Desirably, a lip of material 48 is left at the bottom of opening 34 (in the shroud 32) to prevent the passage of materials from plug 30 or thermocouple 25 or associated materials into the inside of casing 18.

Opening 64 is formed extending through the inside of shroud 32. Desirably, this opening is about 1/8 inch in diameter but can vary to a diameter sufficient to permit the entry of thermocouple 25. The opening is of a size such that materials other than the tip of the thermocouple cannot enter the inside of casing 18 through opening 64. Thermocouple 25 as so positioned can sense the temperature in gap 27 between the tip of turbine blade 14 and shroud 32 as shown in FIG. 3. The thermocouple tip is sufficiently small that if for any reason it becomes detached and enters casing 18, the resulting damage will be minimal.

As will be immediately apparent, if turbine blade 14 is engaging shroud 32, considerable friction will be generated and high temperature will result. This temperature will be sensed by thermocouple 25 and can be noted by an operator of the turbine. If gap 27 is too wide as a result of the abrasion of shroud 32, misalignment of shaft 12 in the turbine, or the like, hot gases in excess of the design amount will pass through gap 27, thereby raising the temperature of thermocouple 25. Either of these abnormal conditions will result in higher than desired temperatures in gap 27.

While not shown, it is well known in the art that the leads of a thermocouple can be connected to a suitable monitor to determine the temperature at the thermocouple and display the temperature in a selected format.

In FIG. 4, an alternate embodiment of the plug is shown. Plug 30 is formed as a larger plug of a type commonly used to plug an opening for a boroscope that may be used to look inside casing 18 during shutdown periods by removal of the plug. Plug 30 plugs opening 34, generally with a solid plug and is retained in position by compression urging plug 30 into casing 18. Opening 34 extends into casing 18 and has a reduced diameter section near its exit into the inside of casing 18 as defined by a lip 48, which defines a reduced diameter opening 64. This opening is typically used for the admission of a boroscope into casing 18 for viewing the inside of casing 18. This plug, as shown, includes at least one shoulder 31 on the plug positioned to matingly engage a shoulder 33 in opening 34. As shown, two sets of shoulders are provided, although one or more could be used. These shoulders are used to restrict movement of plug 30 beyond a desired distance into opening 34. Typically, a space 58 (shown in FIG. 5) remains between the inside end of plug 30 and lip 48.

In the embodiment shown in FIG. 4, a boroscope plug has been modified by positioning a thermocouple support 50 through plug 30. Thermocouple support 50 is supported in position by a plug cover 42 and a retaining nut 44 such as a swag lock fitting. Thermocouple 25 is supported in thermocouple support 50 as it is positioned in a passageway 46 through plug 30. Thermocouple support 50 includes a tapered section 38 that matingly engages a tapered section 39 in opening 34. The mating of these tapered sections ensures that thermocouple support 50 cannot extend into or beyond reduced diameter opening 64. Thermocouple 25 is positioned to extend into reduced diameter opening 64 to sense the temperature in gap 27 (not shown in FIG. 4).

A wide variety of mounting systems could be used to position a thermocouple in temperature sensing contact with the gap. The monitoring systems must be effective to position the thermocouple as discussed above and must be of a configuration effective to prevent the entry of objects into casing 18 upon any equipment failure and the like.

The use of the thermocouple to determine the temperature in the gap during operation of the turbine enables the operator to determine the performance of the turbine. The temperatures sensed are indicative of the performance of the turbine as discussed above.

Desirably, a plurality of thermocouples are positioned at radially spaced-apart locations in casing 18 so that the temperature can be determined at a plurality of locations. During optimum operating conditions in turbine 10, the temperature will desirably be substantially the same at all sensing locations. When reduced spacing in the gap is present at a location, the gap may experience a lower flow of heated gases past the tips of the turbine blades, i.e., through gap 27, and as a result may experience lower temperatures than a thermocouple at a different location which may be exposed to a higher than desired flow of hot combustion gases and may sense a higher than normal temperature.

As discussed previously, friction with the shroud may result in abnormal temperatures as well. Such variations in temperature can readily be determined by the operator to be indicative of uneven gas flow past the ends of the turbine blades, possible misalignment or the like.

A large number of thermocouples can be positioned around casing 18 in the circular path traversed by the blades as they rotate.

The temperature may be determined substantially continuously and recorded, the temperature may be determined periodically or the temperature may simply be determined randomly.

The thermocouple may extend to the inside of shroud 32 but desirably does not extend beyond the inside of shroud 32. Preferably, the thermocouple ends at a distance from about 1/16 to about 1/32 of an inch inside the inside 66 of shroud 32 by shown by arrows 68 in FIGS. 4 and 5.

Desirably, the thermocouple is positioned in temperature sensing communication with the gap of a first row of turbine blades. Determination of the efficiency of the turbine is most important in the first row of turbine blades, which first contact the high-temperature, high-pressure combustion gases. Similarly, thermocouples can be positioned around casing 18 in the circumferential path traversed by turbine blades in second, third or subsequent rows of turbine blades if desired. Desirably, at least one thermocouple is used in each row of blades and desirably a plurality of thermocouples are used in at least the first row of blades.

By the use of the apparatus and method of the present invention, the temperature in the gap formed by the rotation of the turbine blade tips inside shroud 32 can be monitored. As indicated, this monitoring is indicative of the performance of the turbine.

By use of the apparatus of the present invention, a minimal to non-existent risk exists for the entry of foreign material into the turbine. Clearly, the entry of foreign material into the turbine can be disastrous with respect to the turbine components. According to the present invention, a lip is left at the bottom of the opening into shroud 32 with only a small hole being positioned through the lip. This lip is of a thickness sufficient to prevent the entry of foreign objects into the turbine. The only opening into the turbine is the opening sized to receive the thermocouple. Since the thermocouple is encased in a coaxial cable and is retained in the thermocouple support along most of its length, it cannot extend further into the turbine than the desired distance. As indicated previously, desirably the thermocouple does not extend into the turbine at all but rather is positioned in the reduced diameter opening so that it can sense the temperature in the gap without actually extending into the gap. While, as noted, the configuration of opening 64 prevents the passage of materials into casing 18, the presence and configuration of plug 30 (FIG. 4) or thermocouple support 50 (FIG. 3) in opening 34 prevent the escape of high-pressure gases from casing 18.

The determination of temperatures from thermocouple readings is well known to the art and will not be discussed in any detail. The temperatures monitored at a plurality of locations will be indicative of conditions at those locations. For instance, if the temperatures on one side of the turbine are higher than those on the opposite side of the turbine, it would be indicative of an abnormality which could create higher temperatures on one side of the turbine than the other. The operator is then aware that the turbine is operating inefficiently.

Desirably, the temperatures for optimum operation can be determined at times of optimum operation and used as standards for comparison to any currently measured temperatures to determine whether the turbine is operating at optimum conditions. Such comparisons are clearly within the expertise of those skilled in art.

Figure 5:
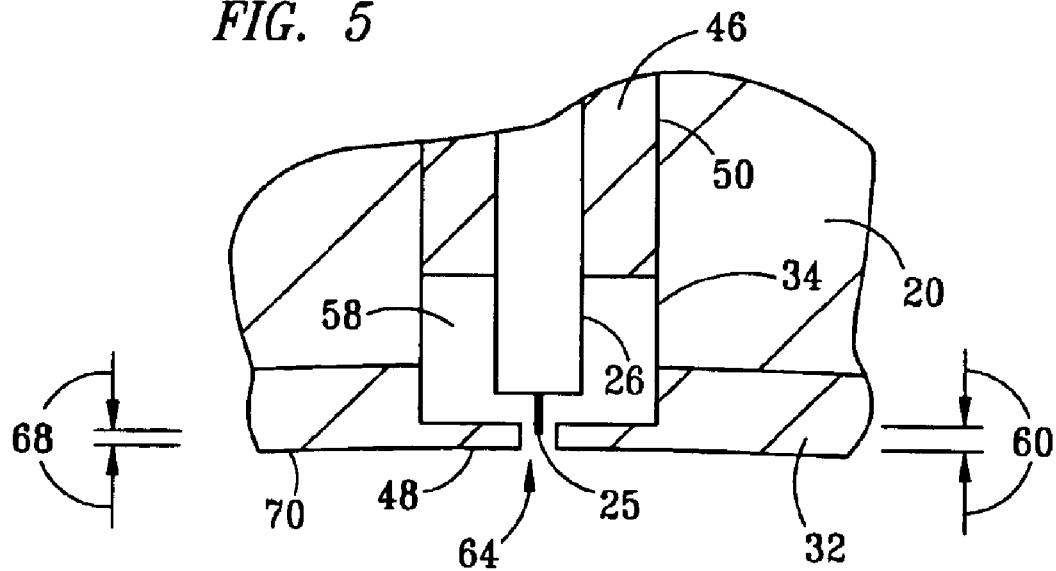

In FIG. 5, a more detailed showing of opening 64 is shown. As shown, the end of thermocoule support 50 extends through the inside of casing 18 and into shroud 32. A space 58 remains between the inside end of thermocouple support 50 in opening 34 which extends through casing 18 and into shroud 32. This space remains so that plug 30 and thermocouple support 50 may be urged into tight and sealing mating engagemet inside opening 34. As indicated previously, the sealing engagement between plug 30 and thermocouple support 50 is achieved by urging these two members into close contact with the inside of opening 34.

A lip 48 forms opening 60 in the inside surface 70 of shroud 32. Lip 48 is of a sufficient thickness to prevent the entry of objects into the inside of casing 18. As shown, thermocouple 25 extends only a short distance beyond the end of coaxial cable 26. By thus exposing only a short portion of thermocouple 25, the amount of material which is available at opening 64 for entry into the inside of casing 18 in the event of equipment failure is greatly reduced. Desirably, thermocouple 25 extends to a distance from about 1/16 to about 1/32 of an inch from the inside of shroud 32. This distance is show by arrows 68 in FIG. 5.

This thickness of lip 48 as shown in FIG. 5 by arrows 60 is typically from about 1/32 to about 1/16.

While this detailed showing of the detailed showing of the details of opening 64 and the position of the thermocouple through shroud 34 is illustrative of the present invention, it is recognized that variations in the method and apparatus for positioning the thermocouple through opening 64 could be used. According to the present invention, a plug is used to support the thermocouple through casing 18 and into shroud 32 using an existing opening or by the use of a specially drilled hole, as shown in FIG. 3, which can contain a thermocouple support. In either event, it is necessary that the opening into the inside of casing 18, i.e., opening 64 through the inside of shroud 32, be small enough to prevent the entry of objects of a size sufficient to damage the turbine into the inside of casing 18. As shown, the use of lip 48 around the inside of opening 34 provides a small opening 64 which is used to permit access by a thermocouple to the temperature in gap 27.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

Having thus described the invention, we claim:

1. A method for monitoring the performance of a turbine, the turbine comprising a casing having an inside and an outside, a shroud positioned on the inside of the casing in the same plane as the rotation of the turbine blades, the shroud having an inside, the casing containing a plurality of turbine blades rotatably mounted in at least one row on a shaft for rotation inside the shroud with tips of the turbine blades defining a gap between the tips of the rotating blades and the inside of the shroud; the method comprising:
   a) positioning at least one thermocouple in the shroud and in temperature-sensing communication with the gap; and,
   b) determining the temperature in the gap during operation of the turbine, the temperature in the gap being indicative of the performance of the turbine.

2. The method of claim 1 wherein the temperature is determined at least periodically.

3. The method of claim 1 wherein the thermocouple is positioned through the casing.

4. The method of claim 1 wherein the determined temperature is compared to an optimum temperature for turbine operation.

5. The method of claim 1 wherein a plurality of thermocouples are positioned in the temperature-sensing communication with the gap at a plurality of radially spaced-apart locations around the casing.

6. A method for monitoring the performance of a turbine, the turbine comprising a casing having an inside and an outside, a shroud positioned on the inside of the casing in the same plane as the rotation of the turbine blades, the shroud having an inside, the casing containing a plurality of turbine blades rotatably mounted in at least one row on a shaft for rotation inside the shroud with tips of the turbine blades defining a gap between the tips of the rotating blades and the inside of the shroud; the method comprising:
   a) positioning at least one thermocouple in the shroud and in temperature-sensing communication with the gap at a plurality of radially spaced-apart locations around the casing; and,
   b) determining the temperature in the gap during operation of the turbine, the temperature in the gap being indicative of the performance of the turbine, wherein the temperature at each spaced-apart location is compared to an optimum temperature for turbine operation for each such spaced-apart location.

7. The method of claim 1 wherein the thermocouple is positioned in temperature-sensing communication with the gap of a first row of turbine blades.

8. The method of claim 7 wherein a plurality of thermocouples is positioned in the temperature-sensing communication with the gap at a plurality of radially spaced apart-locations around the casing.

9. The method of claim 1 wherein at least one thermocouple is positioned in temperature sensing communication with each of the gaps of a plurality of rows of turbine blades.

10. A method for monitoring the performance of a turbine, the turbine comprising a casing having an inside and an outside, a shroud positioned on the inside of the casing in the same plane as the rotation of the turbine blades, the shroud having an inside, the casing containing a plurality of turbine blades rotatably mounted in at least one row on a shaft for rotation inside the shroud with tips of the turbine blades defining a gap between the tips of the rotating blades and the inside of the shroud; the method comprising:
   a) positioning at least one thermocouple in the shroud and in temperature-sensing communication with each of the gaps of a plurality of rows of turbine blades; and,
   b) determining the temperature in the gaps during operation of the turbine, the temperature in the gaps being indicative of the performance of the turbine, wherein a plurality of thermocouples are positioned in temperature-sensing communication with each of the gaps of a plurality of rows of turbine blades at a plurality of radially spaced-apart locations around the casing.

11. A system for monitoring the performance of a turbine, the turbine comprising a casing having an inside and an outside, a shroud positioned on the inside of the casing in the same plane as the rotation of the turbine blades, the shroud having an inside, the casing containing a plurality of turbine blades rotatably mounted in at least one row on a shaft for rotation inside the casing with tips of the turbine blades defining a gap between the tips of the rotating blades and the inside of the shroud; the system comprising:
   a) a plug positioned in an opening in the casing and the shroud;
   b) a reduced diameter section of the opening in the casing and the shroud positioned to form a reduced diameter opening in the inside of the shroud;
   c) a portion of the plug configured to engage a portion of the opening in the casing and configured to restrict passage of the plug past the portion of the opening in the casing; and
   d) a thermocouple positioned through the plug and in temperature-sensing communication with the gap through the reduced diameter opening.

12. The system of claim 11 wherein the portion of the plug configured to engage a portion of the opening in the casing is a shoulder positioned on an outside of the plug configured to engage a shoulder in the opening.

13. The system of claim 11 wherein the portion of the plug configured to engage a portion of the opening in the casing is a tapered section configured to engage a mating taper on the inside of the opening.

14. The system of claim 11 wherein a thermocouple support is positioned at least partially through the plug to retain the thermocouple in position in the plug.

15. The system of claim 14 wherein the portion of the plug configured to engage a portion of the opening is a tapered section on a thermocouple support and configured to engage a mating taper in an opening in the plug.

16. The system of claim 11 wherein the plug comprises a thermocouple support and wherein the portion of the plug configured to engage a portion of the opening in the casing is a tapered section on the thermocouple support configured to engage a tapered section in the opening in the casing.

17. The system of claim 11 wherein the thermocouple is positioned to extend into the reduced diameter opening to a distance from about $\frac{1}{32}$ to about $\frac{1}{16}$ inch inside the inside of the shroud.

18. The system of claim 11 wherein a plurality of thermocouples are positioned at radially spaced-apart temperature sensing locations in a plurality of radially space-apart plugs.

19. The system of claim 18 wherein a plurality of thermocouples is positioned in a first row of turbine blades.

20. The system of claim 11 wherein at least one thermocouple is placed in each of a plurality of rows of turbine blades.

* * * * *

UNITED STATES PATENT AND TRADEMARK OFFICE
CERTIFICATE OF CORRECTION

| | | |
|---|---|---|
| PATENT NO. | : 7,013,718 B2 | Page 1 of 1 |
| APPLICATION NO. | : 10/424625 | |
| DATED | : March 21, 2006 | |
| INVENTOR(S) | : Steve Ingistov and Michael R. Storar | |

It is certified that error appears in the above-identified patent and that said Letters Patent is hereby corrected as shown below:

Title Page, please insert -- (74) *Attorney, Agent or Firm* -- Patrick Kim --.

Signed and Sealed this

Twenty-second Day of August, 2006

JON W. DUDAS
*Director of the United States Patent and Trademark Office*